JOHN HIDDEN. Wind-Wheel
No. 74687
PATENTED FEB 18 1868
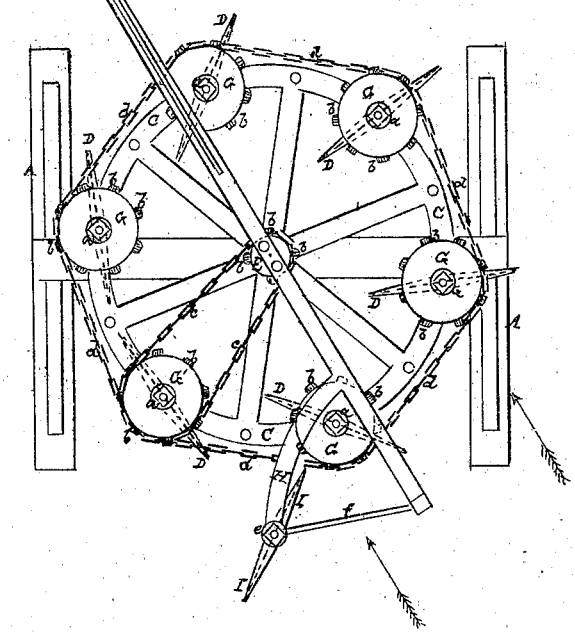
Fig. 1.
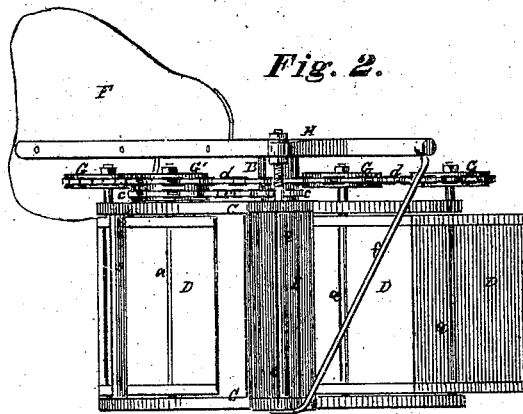
Fig. 2.
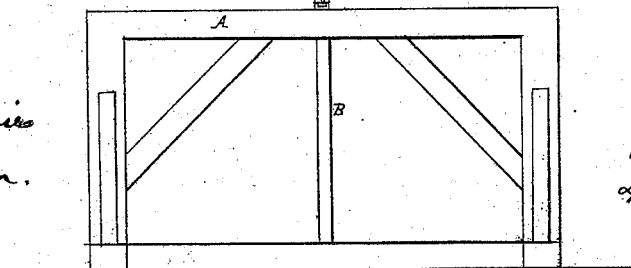
Witnesses.
Guy C. Humphries
Chas. H. Herron.
Inventor
John Hidden
by
L. E. Tomes & Co
his Attorneys

United States Patent Office.

JOHN HIDDEN, OF LAWRENCE, KANSAS.

Letters Patent No. 74,687, dated February 18, 1868.

IMPROVEMENT IN WIND-WHEELS.

The Schedule referred to in these Letters Patent and making part of the same.

TO ALL WHOM IT MAY CONCERN:

Be it known that I, JOHN HIDDEN, of Lawrence, in the county of Douglas, and in the State of Kansas, have invented a new and useful Improvement in Wind-Wheels, which may be applied to water-wheels submerged in a stream of running water; and I do hereby declare that the following is a full, clear, and exact description thereof, reference being had to the annexed drawings making part of this specification, in which—

Figure 1 is a plan or top view of a wind-wheel, showing my improvement, and
Figure 2 is an elevation of the same.

The nature of my invention consists in the adaptation to the vane, governing the wheel, of a deflecting-wing, so that the wind may be kept off the wings on the returning side, and made to act on the wings as or a little before they pass the centre of the wheel, towards the direction in which the wind is blowing, the same being an improvement on a wind-wheel already patented.

In the drawings, A A is a frame, erected on or forming part of the structure composing the mill. B is a vertical shaft or spindle, stepped in the lowest part of the frame, and forming the axis of two circular rims, C C, one above the other, between which are the wings D D D, fast upon vertical spindles $a\ a\ a$, which revolve in bearings in the rims C C. The central spindle B extends above the upper rim C, and bears a drum, E, which is loose, and free to revolve upon it. Attached to this drum, so as to be fast upon it, is the stem of the vane F, so constructed as to be always free to be kept by the wind in a plane parallel with its direction, and as it revolves by the shifting of the wind, it carries the drum E round with it. The drum may be of any diameter, to accord with the size and power of the wind-wheel, and may have any number of cogs or teeth, $b$, upon its perimeter. In the drawing, four teeth are shown. The spindles $a$ of the wings D also extend above the upper rim C, and support at their upper ends pulleys or wheels G G G', which are exactly twice the diameter of the drum E, and have each twice the number of teeth $b$ on their perimeters, of the same shape and size as the teeth on the drum. The wheel G' is of double face, and has two rows of cogs, $b$, one exactly over the other. All the wheels G G' are so secured upon their spindles $a$ by a screw and nut, that the wings may be turned, and set as desired, without causing the wheel to revolve. An endless chain, $c$, connects the drum E and the wheel G', while another endless chain, $d$, extends around, and connects all the wheels G G'. The chains $c$ and $d$ communicate motion between the wheels by means of the cogs $b$, which also prevent the chains from slipping down or around the wheels G.

For the proper action of the wind-wheel, the wings D are so set by the screws and nuts on their spindles, that while they are on one side of the vane F, supposing this to be fixed in one direction by the action of the wind, their planes shall be parallel with it, and edgewise to the wind. Now, as the drum E is one-half the diameter of the wheels G, it is evident that the wings, while making half of the circuit around the central spindle B, will make a quarter revolution on their own spindles, $a$, so that when they arrive opposite the side on which they were parallel with the vane, they will stand at right angles with it, and their broad surfaces will be presented to the wind, the endless chain $d$, surrounding and connecting the wheels G, preserving the relative positions of the wings with each other, while the endless chain $c$ preserves their relative positions with regard to the vane F, however it may be shifted with the wind. A brake, not shown in the drawing, may be applied to the lower rim C of the wheel, in any manner known to mechanics, so that the wheel may be retarded or checked in its rotation when necessary; and when it is found expedient to have the wheel at rest for any length of time, for repairs or other purposes, the nuts on the tops of the spindles $a$ may be loosed, and the wings all turned, so as to present their edges to the wind, in which position they will be kept by the vane, as they will, through the endless chains, be always kept parallel with it, until it is required to change them again.

To the end of the stem of the vane which points to the quarter from which the wind blows is attached an arm, H, forming an angle of about sixty degrees with the stem, and supporting at its outer extremity the upper bearing of the spindle $e$ of the deflecting-wing I. The foot of the spindle is stepped in the lower end of the brace $f$, firmly attached to and descending from the end of the stem of the vane. A screw and nut on the top of the spindle $e$ secure the deflecting-wing from varying its position when placed at any angle with the direction of the wind. This position will be determined by the force of the wind, and will be such as to break off the wind from the wings that are moving up edgewise towards the wind, and deflect it against the full face of the wings as they pass from behind the protection of the deflector I.

The arrangement herein described, of wings, vane, and deflector, may be adapted, with slight modifications, due to the difference in elements, to water-wheels, constructed in a substantially similar manner, and submerged in a stream of running water.

Having thus fully described my invention, what I claim therein as new, and desire to secure by Letters Patent, is—

The combination of the adjustable deflector I with the vane F, drum E, wings and spindles D and a, wheels G G', and chains c and d, substantially as described.

In testimony that I claim the above-described improvement in wind-wheels, I have hereunto signed my name, this 21st day of March, 1867.

JOHN HIDDEN.

Witnesses:
    E. D. LADD,
    JOHN NORTON.